Patented June 19, 1951

2,557,059

UNITED STATES PATENT OFFICE 2,557,059

METHOD OF CONCENTRATING THE IRON CONTENT OF IRON ORES

Vincent S. de Marchi, Jamaica, N. Y., assignor to Institute of Gas Technology, Chicago, Ill., a corporation of Illinois No Drawing. Application August 17, 1948, Serial No. 44,803

6 Claims. (Cl. 241—17)

This invention relates to a method of concentrating the iron content of certain iron ores heretofore found unsuitable for beneficiation and/or manufacture of metallic iron.

The normal upper limit for the silica content of commercially used iron ores is about 10 to 12%. Large deposits are available of iron ores containing a major proportion of magnetite together with a minor proportion of hematite and characterized by a silica content considerably in excess of 12%, for instance, from 30 to 50%. In these ores, the iron oxides, and particularly the hematite, are closely or intimately interlocked with the silica. However, it has so far been found impossible, in spite of numerous efforts, to render these iron ores suitable for the commercial manufacture of metallic iron. In particular, it has been found impossible to reduce the silica content to between 2 and 3%, so as to render the sponge iron produced from such ores suitable for charging the open hearth.

I have now found that the "unconcentratable" iron ores above referred to may be treated by a method described hereinbelow to effect a satisfactory reduction in silica content with a good recovery of the initial iron content of the ores. The method in practice does not require the use of a rotary kiln, although, if desired, such a kiln may be employed for carrying out the method. The following steps are involved. First, the ore is preferably comminuted to a relatively fine particle size, in particular, to minus 100 mesh size. Secondly, the ore is reduced to a temperature of between 1100° F. and 1700° F. and preferably above 1200° F., as with a gaseous reducing medium such as hydrogen or mixtures of hydrogen and carbon monoxide, although solid reducing agents such as finely divided carbonaceous material may also be used. After reduction (which need not necessarily be complete, but ordinarily will be substantially complete if temperatures toward the upper limit of 1700° F. are used), the reduced material is allowed to cool in an inert or reducing atmosphere and is only thereafter exposed to the air. The particle size of the product thus obtained is virtually unchanged, if the ore has been reduced in static condition. But if the ore particles have been kept in continuous movement during the reducing step, as by blowing a reducing gas through a bed of particles to fluidize the same, or by carrying out the reduction process in a rotary kiln, then the ferruginous particles, but not the siliceous particles, agglomerate to form friable nodules wherein the iron is more or less sintered. The reduced ore is suitably subjected to a separation step for bringing about a preliminary separation of the silica from the reduced ores. This separation step may take the form of a dry magnetic separation applicable regardless whether or not agglomeration or "nodulizing" has taken place during the reduction. However, if "nodulizing" has taken place, then simple screening, as through a 100 mesh screen, suffices. Other relatively simple mechanical classifying methods may also be employed. The ferruginous or magnetic fraction obtained in the preliminary separation step is next ground finely, as by wet ball milling, to pass, for instance, a 325 mesh screen and, for best results, to a particle size of 20 microns or less, for instance, 10 microns or less. The ground magnetic fraction is finally subjected to a wet magnetic separation yielding a magnetic fraction containing less than 3% silica and ordinarily around 2% silica, depending on the efficiency of the wet magnetic separation. In other words, small differences amounting to fractions of one percent in silica content have been noted, depending on the exact type of method employed for wet magnetic separation. The total iron recovery in the steps so far enumerated exceeds 75% and may reach 90% or higher. The non-magnetic fractions obtained in the wet magnetic separation step have a composition similar to that of the original ore and may be returned to the reduction chamber, whereby the total iron recovery may be increased to about 90% or higher.

It is, therefore, an important object of the present invention to provide a method for treating "unconcentratable" iron ores, particularly taconites, characterized by the presence of a major proportion of magnetite, some hematite, and considerable silica closely interlocked with iron oxide, in particular, with the hematite, said method yielding a more or less completely reduced or metallic product containing less than 3% silica and ordinarily around 2% silica.

Other and further objects and features of the present invention will become apparent from the following description and appended claims.

By way of example, applicant describes hereinbelow the reduction and further treatment of a taconite from Black River Falls, Jackson County, Wisconsin, in which the reduction was carried out in a fluidized state by the method and apparatus disclosed and claimed in the copending application of John C. Kalbach, Vincent S. de Marchi and Frederick W. Sullivan, Jr., Serial No. 549,914, filed August 17, 1944, now Patent Number 2,538,201 and entitled: "Method of Reducing Metallic Oxides." The ore reduced was the same as that hereinabove described as having been used in two reduction experiments.

More particularly, the ore to be reduced was placed in a vertical cylindrical chamber in which the ore was kept in a constant state of agitation by an upwardly moving stream of gas producing in the ore mass a turbulent or boiling motion and an expansion in apparent volume. In this case, hydrogen was employed for reduction at a temperature of from 1380° to 1540° F. for 4⅓ hours, after which time the product was allowed to cool in the reduction chamber in a hydrogen atmosphere. Analysis of the reduced material showed 50.1% reduction. However, a determination of the amount of water generated during the reduction process and carried away by the hydrogen indicated a reduction of approximately 80%. It is believed that this apparent conflict may be explained as being due to a reoxidation of the reduced material when exposed to air. The reduced product was characterized by the following screen analysis:

|  | Percent |
|---|---|
| 20 to 60 mesh | 44.2 |
| 60 to 100 mesh | 1.6 |
| 100 to 200 mesh | 25.2 |
| 200 to 325 mesh | 15.4 |
| —325 mesh | 13.6 |

The plus 100 mesh fraction contains about 95% of the iron content of the ore and about 25% of the silica content of the ore, being characterized by a 66.8% iron content and a 17.8% silica content. The minus 100 mesh fraction contains about 5.2% iron and about 81.5% silica.

If the reduced product is subjected to a magnetic separation, there are obtained a magnetic fraction amounting to 64.9% together with a non-magnetic fraction amounting to 35.1%. The magnetic fraction contains 67.2% iron together with 17.4% silica, whereas the non-magnetic fraction contains 3.3% iron together with 85.4% silica. In other words, approximately the same result, with respect to iron concentration and silica removal, are obtained by screening through a 100 mesh screen and by dry magnetic separation.

The plus 100 mesh fraction was ball milled for 25 minutes, and the ball milled material was suspended in water to form a slurry which was agitated in a container. An electromagnet was immersed within the container and agitation continued until separation had been effected. At this time the magnetic fraction was removed and dried. The magnetic fraction amounted to 72.3%, while the non-magnetic fraction amounted to 27.7%. The magnetic fraction contained 84.6% iron and 2.18% silica, while the non-magnetic fraction contained 29.0% iron and 52.3% silica. The non-magnetic fraction was returned to the reaction chamber for repeated nodulizing reduction.

When the ball milling was continued for 50 minutes, and wet magnetic separation was carried out, there were obtained a magnetic fraction amounting to 67.9% together with a non-magnetic fraction amounting to 32.1%. The magnetic fraction contained 1.29% silica and 86.2% iron, while the non-magnetic fraction contained 33.9% iron and 45.9% silica.

When ball milling was continued for 75 minutes, and wet magnetic separation was carried out, there were obtained a magnetic fraction amounting to 54.0% and a non-magnetic fraction amounting to 46.0%. The magnetic fraction contained 87.9% iron together with 1.36% silica, while the non-magnetic fraction contained 45.7% iron and 32.6% silica.

Similar results were obtained in ball milling the magnetic fraction of the reduced material and subsequent wet magnetic separation.

It should be noted that in the above ball milling, the particle size of the magnetic fraction and of the plus 100 mesh fraction of the reduced material was reduced to the point where the material would pass a 325 mesh sieve.

It should be noted that if the plus 100 mesh fraction or the magnetic fraction of the reduced material is not ground to minus 325 mesh size, or if such grinding is carried out but dry instead of wet magnetic separation is attempted, it is not possible to reduce the silica content to 3% or less and the iron recovery will ordinarily be less than 50%. In particular, insufficiently fine grinding yields a product containing excessive amounts of silica (say, from 10% upwards), while dry instead of wet magnetic separation lowers the iron recovery.

Results similar to those described hereinabove (involving the reduction of silica content to less than 3% together with an iron recovery of at least 75%) have been obtained by static reduction, although the reduced material must then be subjected to a preliminary dry magnetic separation, since no change in particle size occurs during the reduction.

Applicant has conducted a number of experiments with magnetite ores and with hematite ores and/or waste tailings, in order to elucidate and explain the phenomena that actually take place in the process of the present invention. These experiments have shown that, under the claimed conditions of reduction, hematite is reduced relatively more rapidly than magnetite. This difference in rate of reduction is apparently due to the formation of a relatively impervious layer of metallic iron about the partially reduced magnetite particles. Further, these partially reduced magnetite particles appear to contain, in addition to the metallic iron, ferrous oxide, or FeO. Finally, reduced hematite appears to be more resistant to reoxidation than reduced magnetite.

In view of these experimental findings, the results may be explained as follows. First, the hematite is preferentially reduced to metallic iron and tends to remain in reduced condition. Thus, the hematite is rendered amenable to magnetic separation. Secondly, the magnetite is reduced largely to metallic iron but, to some extent, only to ferrous oxide. Whatever reoxidation occurs on exposure to air of the reduced magnetite apparently leads to the formation of magnetite, possibly due to heat generated on oxidation of metallic iron, and the ferrous oxide seems to be oxidized as well as the iron. In this manner, the reduced magnetite and hematite are rendered amenable to magnetic separation, either in the form of metallic iron or in the form of magnetite.

However, before such magnetic separation can be carried out, the reduced material must be ground to at least minus 325 mesh size in order to disengage the silica from the ferruginous particles and, because of the fine particle size, wet rather than dry magnetic separation must be carried out. The preliminary dry magnetic separation or screening carried out before grinding is carried out to take advantage of the fact that a certain proportion of the silica particles are not as closely interlocked with the ferruginous particles as are others.

Petrographic studies have indicated that particularly close interlocking occurred as between the silica and the hematite. For this reason, it is particularly important that the hematite be completely reduced or otherwise rendered amenable to magnetic separation.

The agglomeration or "nodulizing" occurring when the particles being reduced are kept in constant movement is believed to be due to sintering taking place between the layers or shells of metallic iron formed around the magnetite particles when reduction is effected. Such nodulizing does not occur when hematite ores are subjected to treatment according to the present invention.

The correctness of the explanatory hypothesis offered hereinabove has been confirmed by preparing mixtures of relatively pure magnetite (from 10 to 20 parts) with hematite (from 80 to 90 parts) containing relatively large amounts of closely interlocked silica (about 75% by weight of the hematite-containing material). The resulting mixture was subjected to treatment by the methods of the present invention to yield products containing less than 3% silica, an iron recovery in excess of 75% being effected.

My process can be used to advantage in the beneficiation of waste tailings by adding the latter to magnetite or taconites containing magnetite. As above described, the starting mixture is ground to the state of subdivision previously indicated, the iron oxides are reduced at a temperature between 1200° and 1700° F., the magnetic or coarse fraction of the reduced mass is wet ball milled to a point where the material will pass a 325 mesh screen and then subjected to a wet magnetic separation. The magnetically separated material will be found to contain less than 3% silica and represent an iron recovery in excess of 75%.

All percentages given herein are percentages by weight unless otherwise specified.

Many details of procedure may be varied within a wide range without departing from the principles of this invention and therefore it is not my intention to limit the patent granted on this invention otherwise than necessitated by the scope of the appended claims.

I claim as my invention:

1. The method of concentrating the iron content of an ore material containing magnetite, hematite and silica closely interlocked with said iron oxides, said method comprising providing said ore material in finely divided form, reducing said ore material at from 1100° to 1700° F. to form metallic iron, separating a magnetic fraction from the reduced product, comminuting the magnetic fraction to minus 325 mesh particle size, and subjecting the comminuted material to a wet magnetic separation.

2. The method of concentrating the iron content of an ore material containing magnetite, hematite and silica closely interlocked with said iron oxides, said method comprising providing said ore material in finely divided form, reducing said ore material at from 1200° to 1700° F. to form metallic iron, separating a magnetic fraction of the reduced product, comminuting the magnetic fraction to minus 325 mesh particle size, and subjecting the comminuted material to a wet magnetic separation.

3. The method of concentrating the iron content of an ore material containing magnetite, hematite and silica closely interlocked with said iron oxides, said method comprising providing said ore material in finely divided form, reducing said ore material at from 1100° to 1700° F. to form metallic iron while maintaining the ore particles in constant motion, screening the reduced product to separate a magnetic fraction, comminuting the magnetic fraction to minus 325 mesh particle size, and subjecting the comminuted material to a wet magnetic separation.

4. The method of concentrating the iron content of an ore material containing magnetite, hematite and silica closely interlocked with said iron oxides, said method comprising providing said ore material predominantly in minus 100 mesh size, reducing said ore material with a gaseous reducing agent to form metallic iron under conditions such that said ore material is maintained in motion during said reduction, separating a coarse fraction from the reduced material, comminuting the coarse fraction to minus 325 mesh particle size, and subjecting the comminuted material to a wet magnetic separation.

5. The method of concentrating the iron content of an ore material containing magnetite, hematite and silica closely interlocked with said iron oxides, said method comprising grinding said ore to minus 100 mesh particle size, confining the ground ore in a reducing chamber, passing a hydrogen-containing reducing gas through the confined ground ore material at from 1100° to 1700° F. to form metallic iron, while maintaining the confined ore material in motion, screening the reduced material through a 100 mesh screen, comminuting the coarse fraction to a particle size not greater than about 20 microns, and subjecting the comminuted material to wet magnetic separation.

6. The method of concentrating the iron content of an ore material containing magnetite, hematite and silica closely interlocked with said iron oxides, said method comprising passing a hydrogen containing gas through said ore material at from 1100° to 1700° F. to reduce said ore material at least partially to metallic iron, separating a magnetic fraction from the reduced product, comminuting the magnetic fraction to about 10 micron particle size, and subjecting the comminuted material to wet magnetic separation.

VINCENT S. DE MARCHI.

REFERENCES CITED

The following references are of record in the file of this patent:

UNITED STATES PATENTS

| Number | Name | Date |
|---|---|---|
| 607,875 | Peak | July 26, 1898 |
| 891,549 | Jones | June 23, 1908 |
| 891,705 | Jones | June 23, 1908 |
| 1,053,436 | Rendall | Feb. 18, 1913 |
| 1,696,188 | Campbell | Dec. 25, 1928 |

FOREIGN PATENTS

| Number | Country | Date |
|---|---|---|
| 274,889 | Great Britain | July 21, 1927 |

OTHER REFERENCES

Magnetic Roasting of Iron Ore, by Edward W. Davis, "The Bulletin of the University of Minnesota," May 10, 1937.